Aug. 16, 1938.   M. KLAVÍK   2,127,409
BODY FOR REAR ENGINE MOTOR VEHICLES
Filed Feb. 4, 1938
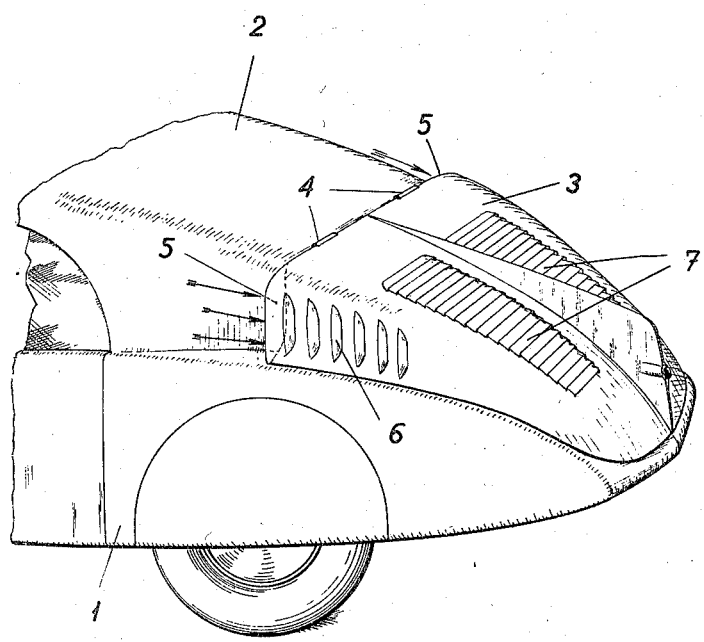
Inventor
Milos Klavík
By B. Singer, Atty.

Patented Aug. 16, 1938

2,127,409

UNITED STATES PATENT OFFICE 2,127,409

BODY FOR REAR ENGINE MOTOR VEHICLES

Miloš Klavík, Kopřivnice, Czechoslovakia

Application February 4, 1938, Serial No. 188,788
In Czechoslovakia February 6, 1937

3 Claims. (Cl. 180—54)

The invention relates to an arrangement for drawing-in and guiding the cooling air in motor vehicles having the engine at the rear, and in particular for vehicles with streamlined bodies the width of which only slightly decreases in the front part towards the front end.

In rear engine motor vehicles having bodies of streamlined form it is difficult to supply sufficient cooling air through air inlet openings arranged in the roof of the body. The reason for this is that at high speeds the front and in particular the windscreen of the body causes the current of air sweeping over the roof to be deflected rather strongly upward, that is, well above the roof, so that a partial vacuum can easily occur at the inlet openings arranged in the roof.

According to the invention the inlet openings for the cooling air are contrived by the upper part of the body being strongly narrowed in plan view in the region of its rear, downwardly sloping part, so that between the sides of this upper part and the cover for the engine compartment formed according to the general contour lines of the body there are created forwardly facing inlet openings for the cooling air. This construction is based on the observation that the upward deflection of the current of air over the roof of the body, caused as already mentioned by the front of the body, becomes less pronounced as the sides of the body are approached and that the current of air along the sides of the body or along the edges between the sides and the roof, flows closely along the walls without upward deflection by the front being still noticeably troublesome.

A further feature of the invention consists in the provision of supplementary inlet openings arranged behind the main cooling air inflow openings in the outer walls of the inflow conduits, and preferably in the vertical sides thereof. These suction openings can be in the form of louvres turned towards the current of air.

The invention is illustrated diagrammatically by the example shown in the accompanying drawing.

The bottom part 1 of the body and the roof 2 with the engine cover 3 extend as a whole seen in plan without any pronounced narrowing towards the back over the whole width of the vehicle. In side view on the contrary, the profile of the roof 2 and the engine cover 3 drops sharply towards the back in order to meet the approximately level bottom of the body. At the front the body can have the usual streamlined form, the roof extending in the forward direction over the passenger space and terminating at the windscreen.

The upper part 2 of the body is strongly narrowed towards the back when seen in plan, so that between the retracted section and the engine cover 3 fastened by hinges 4 there are created air inflow conduits 5 open towards the front. The air is supplied through the openings and conduits 5 in a suitable manner to the radiator or to the engine; if necessary with the co-operation of a fan.

The supply of air can also be improved by the provision of louvres 6 which are so arranged in the sides of the cover 5 that their openings are directed towards the flow of the air. During slow travelling and slight loading of the engine the cooling air entering the openings and conduits 5 as shown by arrows in the drawing will in general suffice. If on the contrary the requirement of cooling air increases, particularly at high speed and heavy loading of the engine, then the openings 5 do not at times suffice, in particular when the air tends to leave the sides in the range of the retracted part and thus to sweep past the openings 5. In such a case the engine can obtain the necessary supply of air or the necessary additional supply of air by suction through the openings 6.

The outlet of the used cooling air takes place through slots 7 opening in the usual way towards the rear.

I claim:

1. A body for a motor vehicle having the engine arranged at the rear, comprising a lower part the side walls of which converge only slightly towards the front and rear ends, an upper part having at its rear a downwardly sloping roof part and side walls which in the region of said downwardly sloping roof part converge more rapidly than the side walls of said lower part, and an engine cover forming in side profile a continuation of said downwardly sloping roof part and having side walls forming an upward continuation of the side walls of said lower body part, the forwardly facing openings thereby formed at each side at the front of the engine cover serving as inlet openings for engine-cooling air.

2. A body as claimed in claim 1, including supplementary air inlet openings formed in the side walls of the engine cover.

3. A body as claimed in claim 1 including forwardly facing air inlet louvres formed in the forward parts of the side walls of the engine cover.

MILOŠ KLAVÍK.